US008407369B2

(12) United States Patent
Bondurant et al.

(10) Patent No.: US 8,407,369 B2
(45) Date of Patent: Mar. 26, 2013

(54) DIGITALLY SHREDDING ON REMOVABLE DRIVES

(75) Inventors: Matthew D. Bondurant, Superior, CO (US); Mark Payne, Longmont, CO (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/215,003

(22) Filed: Aug. 22, 2011

(65) Prior Publication Data

US 2012/0036280 A1 Feb. 9, 2012

Related U.S. Application Data

(63) Continuation of application No. 12/024,611, filed on Feb. 1, 2008, now Pat. No. 8,005,996.

(51) Int. Cl.
*G06F 3/00* (2006.01)
*G06F 13/00* (2006.01)
(52) U.S. Cl. .................. 710/5; 710/2; 710/8; 709/217; 711/170
(58) Field of Classification Search .................. None
See application file for complete search history.

(56) References Cited

U.S. PATENT DOCUMENTS

| | | | |
|---|---|---|---|
| 5,253,129 A * | 10/1993 | Blackborow et al. | 360/69 |
| 5,360,651 A * | 11/1994 | Baxter et al. | 428/64.4 |
| 7,224,545 B2 | 5/2007 | Saliba et al. | |
| 7,542,963 B2 * | 6/2009 | Primm | 1/1 |
| 7,991,783 B2 * | 8/2011 | Flynn et al. | 707/759 |
| 8,285,758 B1 * | 10/2012 | Bono et al. | 707/822 |
| 2005/0231846 A1 * | 10/2005 | Winarski et al. | 360/69 |
| 2006/0010301 A1 * | 1/2006 | Yagawa | 711/163 |
| 2006/0031645 A1 | 2/2006 | Flanagin et al. | |
| 2006/0155943 A1 | 7/2006 | Todd et al. | |
| 2006/0236056 A1 | 10/2006 | Nagata | |
| 2006/0262441 A1 * | 11/2006 | Kuhar et al. | 360/1 |
| 2006/0282615 A1 * | 12/2006 | Lodolo et al. | 711/112 |
| 2007/0038821 A1 | 2/2007 | Peay | |
| 2007/0219948 A1 * | 9/2007 | Bugovics | 707/2 |
| 2009/0094228 A1 | 4/2009 | Bondurant et al. | |
| 2009/0094245 A1 | 4/2009 | Kerns | |
| 2010/0241615 A1 | 9/2010 | Marshall et al. | |

* cited by examiner

*Primary Examiner* — Henry Tsai
*Assistant Examiner* — Michael Sun
(74) *Attorney, Agent, or Firm* — Kenneth E. Levitt; Dorsey & Whitney LLP

(57) ABSTRACT

Embodiments provide unique and novel systems and methods for deleting data on removable drives. In embodiments, the removable drives store data that may be erased such that the data is considered destroyed but that allows the removable drive to be reused. The archiving system can determine which data should be erased. Then, the data is digitally shredded on sector boundaries of the removable drives such that the reclaimed memory cannot be read to decipher the erased data. In alternative embodiments, data is written across sector boundaries such that two or more files may occupy a single sector. A journal area allows for copying the data in a sector with two or more files, digitally shredding the sectors in the removable drive, and rewriting the data that was not to be digitally shredded to the original location of the data.

19 Claims, 13 Drawing Sheets

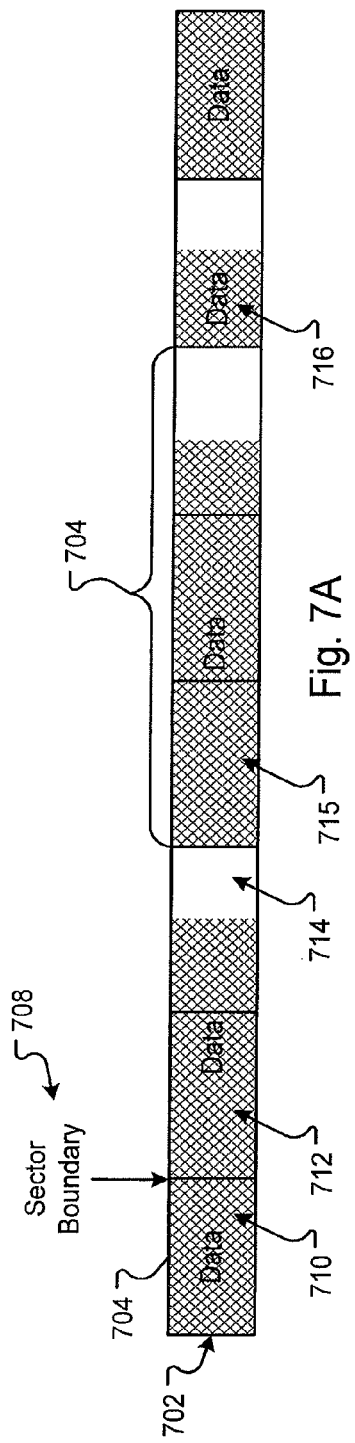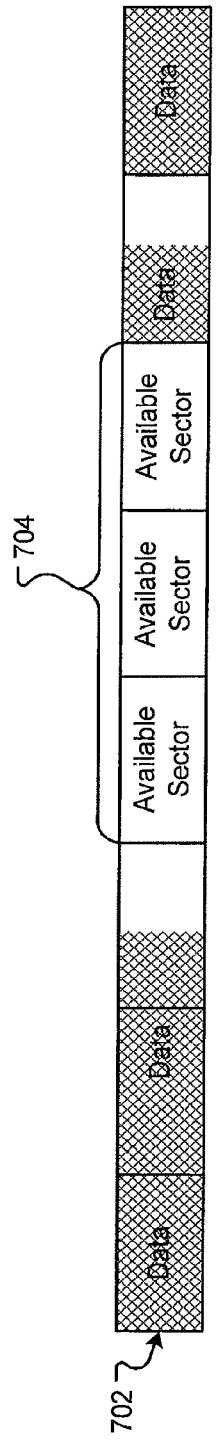
Fig. 7A
Fig. 7B

DIGITALLY SHREDDING ON REMOVABLE DRIVES

CROSS-REFERENCE TO RELATED APPLICATIONS

This application is a continuation of U.S. Ser. No. 12/024,611, filed on Feb. 1, 2008, issued as U.S. Pat. No. 8,005,996 on Aug. 23, 2011, the contents of which are herein incorporated by reference.

BACKGROUND

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more months. Thus, entities that have to meet these storage requirements employ archiving systems to store the data to a media allowing for long-term storage.

Generally, organizations may discard the data at some point. However, due to the sensitive nature of the data, e.g., personal information, confidential information, or secret information, the data is discarded in a safe and secure manner. Some archiving systems physically destroy the media storing the data. However, this solution may also discard a valuable resource—the media itself. In some situations, it may be beneficial to keep the media but destroy the data on the media.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
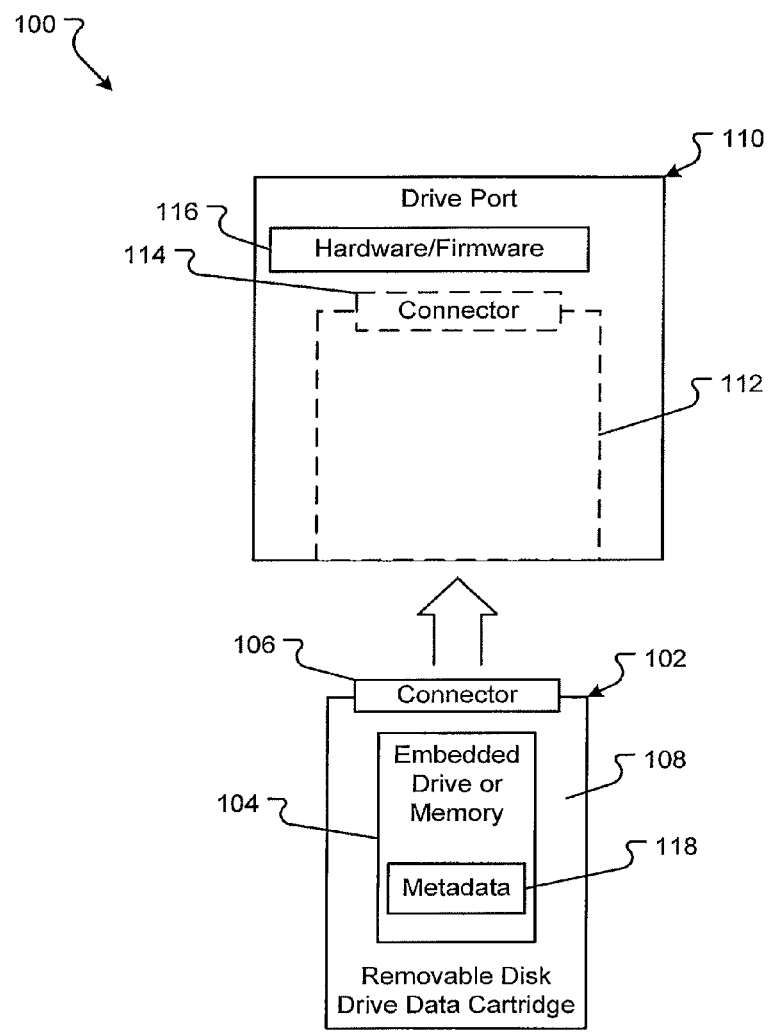
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

Embodiments of the present disclosure provide unique and novel systems and methods for deleting data on removable disk drives. Embodiments include an archiving system having removable hard disk drives embedded in removable disk cartridges, referred to simply as removable disk drives. The removable disk drives provide advantages in speed and data access because, in embodiments, the data is stored and retrieved by random access rather than sequential access. In embodiments, the removable disk drives store immutable data under a write once read many (WORM) control summary that may be erased such that the data is considered destroyed but that allows the removable disk drive to be reused. The archiving system can determine which data should be erased. Then, the data is digitally shredded on sector boundaries of the removable disk drives such that the reclaimed memory cannot be read to decipher the erased data. In alternative embodiments, data is written across sector boundaries such that two or more files may occupy a single sector. A journal area, in embodiments, allows for copying the data in a sector with two or more files, digitally shredding the sectors in the removable disk drive, and rewriting the data that was not to be digitally shredded to the original location of the data.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

An embodiment of a removable disk system 100 to provide long-term archival data storage is shown in FIG. 1. A removable disk drive 102 provides storage capability for the removable disk system 100. In embodiments, the removable disk drive 102 includes a data cartridge case 108 and an embedded memory 104, which may be an embedded hard disk drive (HDD), solid state disk (SSD), solid state drive, or flash memory. The HDD or flash memory 104 provides a random access memory for storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector protrudes from the data cartridge case 108. The data cartridge case 108, in embodiments, provides a solid container for the embedded memory 104 that also functions as an easily swappable or changed case when interchanging removable disk drives 102 in the removable disk system 100.

The embedded memory 104, in embodiments, includes metadata 118. Metadata 118, in embodiments, allows the archiving system to provide different functionality with the removable disk drive 102. Metadata 118 can include any information about the data stored in the memory 104. The information can include memory addresses, protection formats for the data, encryption keys, etc. With the metadata 118 stored in the embedded memory 104, the removable disk drive 102 may be stored and allow the removable disk drive 102 to be reinserted with the same functionality.

In embodiments, the removable disk system 100 contains a drive port 110 that includes one or more data cartridge ports 112, each with a data cartridge connector 114 to receive the removable disk drive 102. The data cartridge connector 114 mates with the electrical connector 106 of the removable disk drive 102 to provide an electrical connection to the removable disk drive 102 and/or to communicate with the embedded memory 104 in the removable disk drive 102. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102 to be easily inserted and removed as necessary. In embodiments, the drive port 110 includes two or more data cartridge ports 112 to allow for the use, control and communication with two or more removable disk drives 102. Each drive port 110, in embodiments, is separately addressable to allow for customized control over each removable disk drive 102 connected to each data cartridge port 112. Thus, as removable disk drives 102 are replaced, the same controls can be applied to the newly inserted removable disk drives 102 because the drive port 110 is addressed instead of the removable disk drives 102.

The embedded memory 104 may be read and used by the hardware/firmware 116 of the drive port 110. The hardware/firmware 116 may be hardware and/or software resident in the drive port 110 for controlling the removable disk drive 102. In embodiments, the hardware/firmware 116 contains the necessary software and/or hardware to power-up the removable disk drive 102, spin-up the disk platters in the embedded memory 104, read and write to the embedded memory 104, read, write and process metadata 118, etc. For example, the hardware/firmware 116 could read the embedded memory 104 to identify the removable disk drive 102 and gather information related to its contents.

In embodiments, the removable disk system 100 operates to receive one or more removable disk drives 102 in the one or more drive ports 110. The electrical connector 106 physically connects or couples with the data cartridge connector 114 to form an electrical connection that allows the drive port 110 to communicate with the embedded memory 104. The hardware/firmware 116 powers-up the embedded memory 104 and begins any initialization processes (e.g., security processes, identification processes, reading and/or writing, etc.). The drive port 110, which, in embodiments, is in communication with a network, receives archival data from one or more servers, applications, or other devices or systems on the network. The hardware/firmware 116 writes the archival data to the embedded memory 104 of the removable disk drive 102 to archive the data.

Figure 2:
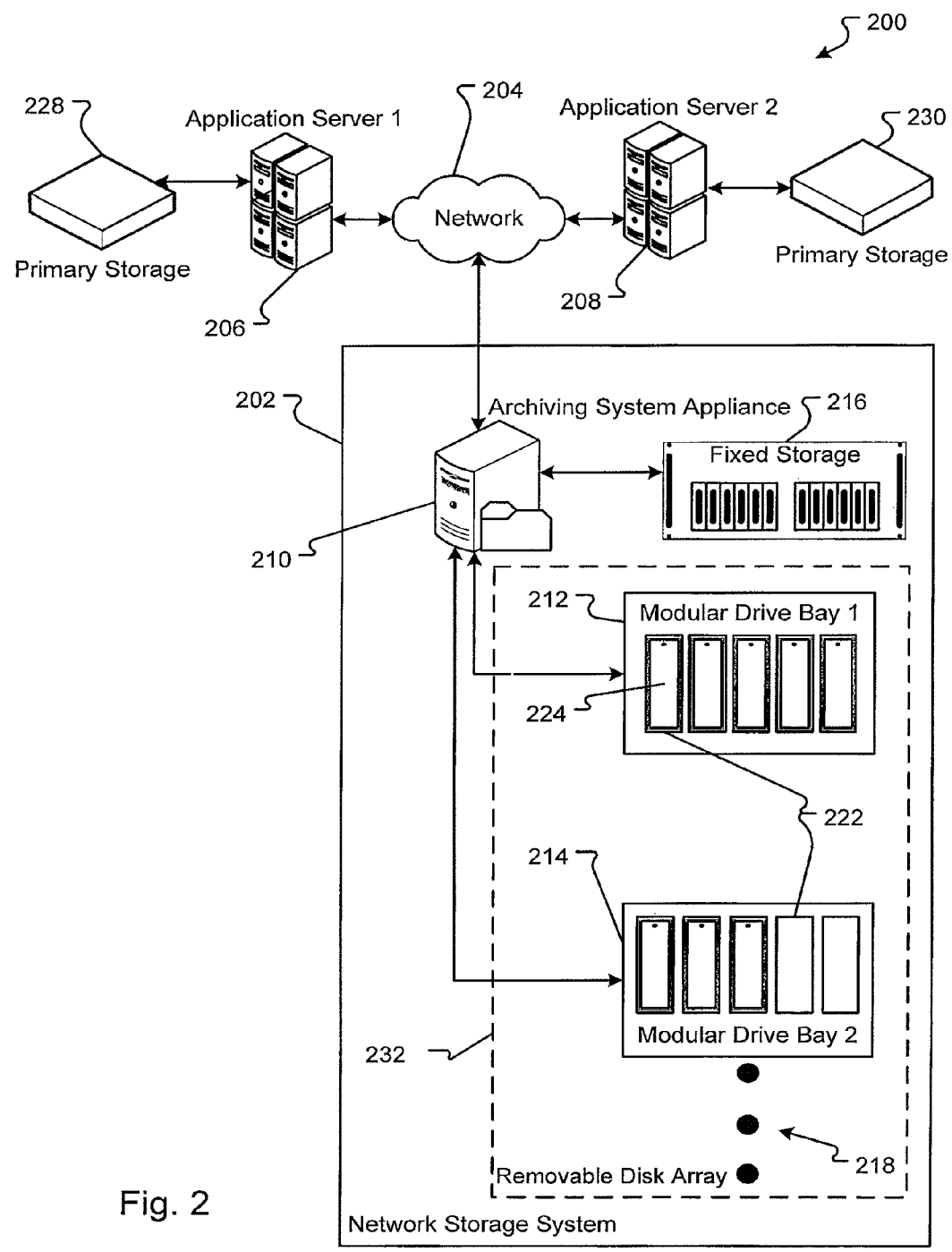
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 224, which may be the same or similar to removable disk drive 102 (FIG. 1), connected or in communication with a drive port 222, which may be the same or similar to drive port 110 (FIG. 1). In alternative embodiments, a modular drive bay 212 and/or 214 includes two or more drive ports 222 that can each connect with a removable disk drive 224. Thus, the modular drive bays 212 and 214 provide added storage capacity because more than one removable disk drive 224 can be inserted and accessed using the same archiving system appliance 210. Further, each drive port 222 in the modular drive bays 212 and 214 are, in embodiments, separately addressable allowing the archiving system appliance 210 to configure the removable disk drives 224 in the modular drive bays 212 and 214 into groups of one or more removable disk drives 224. Two or more modular drive bays 212 and 214, in embodiments, are included in the network storage system 202, as evidenced by the ellipses 218. Thus, as more data storage capacity is required, more modular drive bays 212 and 214 may be added to the network storage system 202. In embodiments, each modular drive bay 212 and 214 may include a single hardware/firmware 116 (FIG. 1) for all drive ports 222 in the modular drive bay 212 and 214. In alternative embodiments, each drive port 222 includes hardware/firmware 116 (FIG. 1).

The exemplary hardware architecture in FIG. 2 provides near limitless capacity as more removable disk drives 224 can be added to existing modular drive bays 212 or 214 until the modular drive bays 212 and 214 hold all possible removable disk drives 224. Then, more modular drive bays 212 and 214 are added to the network storage system 202. Further, removable disk drives 224 may be replaced as the removable disk drives 224 near their storage capacity. The removed disk drives 224, in embodiments, are physically stored if and until the data on the removable disk drives 224 needs to be retrieved. If the data on the removable disk drive 224 needs to be retrieved, the removable disk drive 224 may be inserted into one of the drive ports 222 of the modular drive bay 212 or 214, and the information retrieved from the connected removable disk drive 224.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein. Hereinafter, the archiving system appliance 210 may be referred to as the host.

In embodiments, the two or more modular drive bays 212 and/or 214, having each one or more inserted removable disk drives 224, form a removable disk array (RDA) 232. The archiving system appliance 210 can configure the RDA 232 into one or more independent file systems. Each application server 206 or 208 requiring archiving of data may be provided a view of the RDA 232 as one or more independent file systems. In embodiments, the archiving system appliance 210 logically partitions the RDA 232 into application layer partitions and logically associates one or more drive ports 222 with each application layer partition. An application layer partition is associated with the application server 206 or 208 rather than some arbitrary logical divisions. Thus, the one or more removable disk drives 224 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 224. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 224. If the data is needed in the short term, the archiving system appliance 210 retrieves the data from the fixed storage 216. The archiving system appliance 210, in embodiments, sends the archival data to or removes the archival data from the modular drive bay 212 or 214 having a predetermined address to store or retrieve the archival data from a removable disk drive 224.

The archiving system appliance 210 can also configure the active archive in the fixed storage 216 into one or more independent file systems, as with the RDA 232. As explained above, each application server may be provided a view of one of two or more independent file systems. Each independent file system may comprise an application layer partition in the RDA 232 and a related application layer partition in the fixed storage 216. In embodiments, the archiving system appliance 210 partitions the fixed storage 216 and associates each application layer partition in the fixed storage 216 with an associated application layer partition in the RDA 232.

As explained above, the archiving system appliance 210, in embodiments, determines where and how to store the data to one or more removable disk drives 224. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to the network storage system 202 to be archived. The archiving system appliance 210 receives the archival data and determines where the archival data should be stored. The archival data, in embodiments, is then sent to the related application layer partitions in both the fixed storage 216 and the RDA 232, which may comprise one or more of the removable disk drives 224 in one or more of the drive ports 222. The archiving system appliance 210 can include a memory address(es) for the data to be stored in the removable disk drive 224. The archival data is written to the removable disk drive 224 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 224 and a different portion of the fixed storage 216 because the archival data from application server 2 208 relates to a different application and, thus, a different application layer partition.

Figure 3:
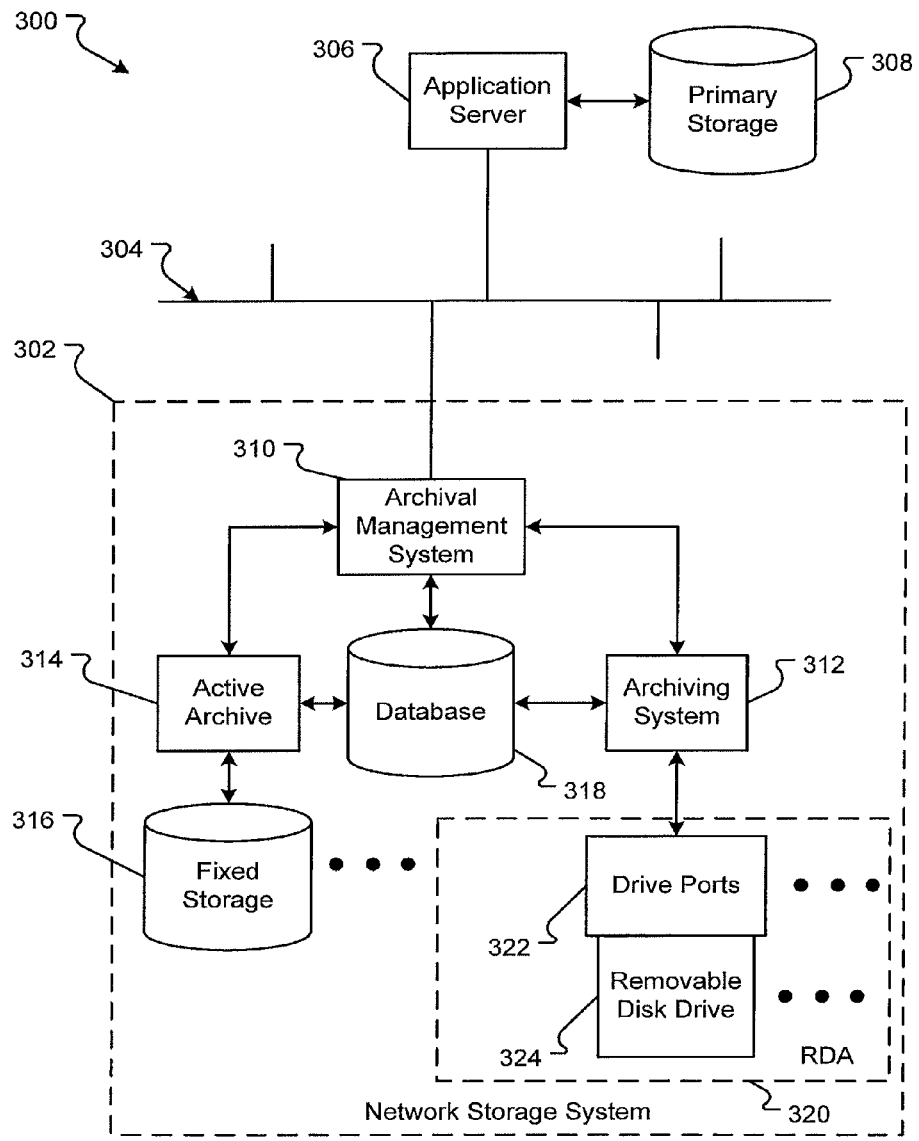
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312 in communication with one or more drive ports 322 that are in communication with one or more removable disk drives 324. The drive ports 322 and removable disk drives 324 are the same or similar in function to those described in conjunction with FIGS. 1 and 2. The archiving system 312 controls the function of the one or more drive ports 322 and writes the archived data to one or more predetermined removable disk drives 324 in the one or more drive ports 322.

In further embodiments, the network storage system 302 comprises an archival management system 310. The archival management system 310 receives data for archiving from one or more systems on the network 304. Further, the archival management system 310 determines to which system or removable disk drive 324 the data should be archived, in which format the data should be saved, and how to provide security for the network storage system 302. In embodiments, the archival management system 310 provides a partitioned archive such that the network storage system 302 appears to be an independent file system to each separate application server 306, yet maintains the archive for multiple application servers 306. Thus, the archival management system 310 manages the network storage system 302 as multiple, independent file systems for one or more application servers 306. In embodiments, the archival management system 310 and the archiving system 312 are functional components of the archiving system appliance 210 (FIG. 2).

In embodiments, the archival management system 310 saves archival data to both the archiving system 312 and an active archive 314. The active archive 314, in embodiments, controls, reads from and writes to one or more fixed storage devices 316 that allow easier access to archived data. In embodiments, fixed storage 316 is similar in function to fixed storage 216 (FIG. 2). The active archive 314 performs similar functions to the archiving system 312 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mirror the associated application layer partitions in the RDA 320. The application layer partition(s) in the active archive 314 may have boundaries associated with memory addresses in the fixed storage 316.

The archival management system 310 may also provide an intelligent storage capability. Each type of data sent to the network storage system 302 may have different requirements and controls. For example, certain organizations, such as the Securities and Exchange Commission (SEC), Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310 can apply controls to different portions of the RDA 320 and the active archive 314 according to user-established data storage requirements. In one embodiment, the archival management system 310 creates application layer partitions in the archive that span one or more removable disk drives 324 and one or more portions of the fixed storage 316. All data to be stored in any one application layer partition can have the same requirements and controls. Thus, requirements for data storage are applied to different drive ports 222 (FIG. 2) in the modular drive bays 212 and 214 (FIG. 2) and to the removable disk drives 224 (FIG. 2) stored in those drive ports 222 (FIG. 2). Further, the requirements are likewise applied to different portions of the fixed storage 316 in the active archive 314. If a removable disk drive is replaced, the same storage requirements, in embodiments, are applied to the replacement removable disk drive 324 because of its location in the controlled drive port 322. As such, the archival management system 310 can individually maintain separate sets of data using different controls, even in different removable disk drives 324.

The network storage system 302 may also comprise a database 318 in communication with the archival management system 310. The database 318 is, in embodiments, a memory for storing information related to the data being archived. The database 318 may include HDDs, ROM, RAM or other memory either internal to the network storage system 302 and/or the archival management system 310 or separate as a discrete component addressable by the archival management system 310. The information stored in the database 318, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310. The archival management system 310, in embodiments, sends the data to one or both of the active archive 314 and/or the archiving system 312 to be archived.

Figure 4A:
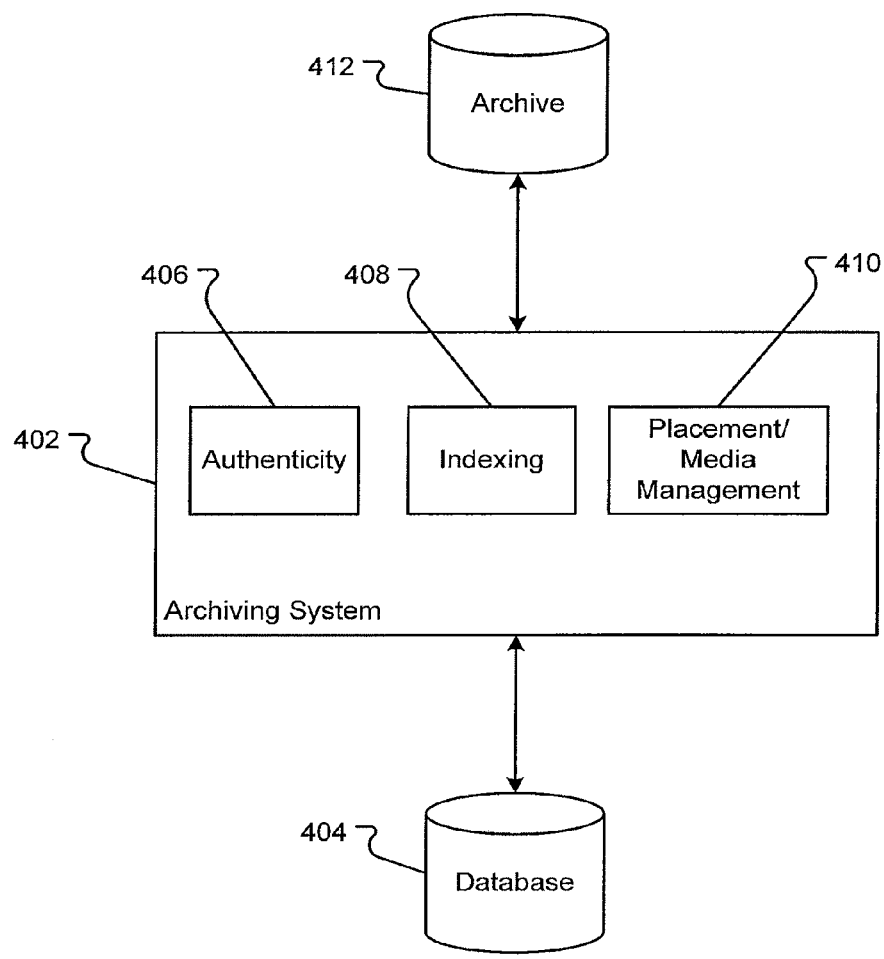
FIG. 4 is a hardware block diagram of an embodiment of a modular drive bay having two or more removable disk drives.

Embodiments of an archiving system 402, including one or more components or modules, are shown in FIG. 4A. The archiving system 402, in embodiments, includes one or more of an authenticity module 406, an indexing module 408, and/or a placement/media management module 410. In embodiments, the authenticity module 406 determines if a removable disk drive 102 (FIG. 1) is safe to connect with the archiving system 402. For example, the authenticity module 406 may complete an authentication process, such as, AES 256, a public-key encryption process, or other authentication process, using one or more keys to verify that the inserted removable disk drive 102 (FIG. 1) has access to the archiving system 402. Information used by the archiving system 402 may be stored in database 404.

The indexing module 408, in embodiments, creates application layer partitions in the archive 412, which may represent the removable disk drives 102 (FIG. 1) in the RDA 232 (FIG. 2), to provide storage areas for different data. For example, the indexing module 408 selects one or more removable disk drives 102 (FIG. 1) to form one or more "drives". "Drive A:\" may comprise one or more removable disk drives 102 (FIG. 1), while "Drive B:\" and "Drive C:\" may also include one or more removable disk drives 102 (FIG. 1). In embodiments, each drive is associated with an application layer partition of the archive 412. There may be fewer than three application layer partitions of the archive 412 or more than three application layer partitions of the archive 412. In embodiments, each drive or application layer partition stores only a predetei mined type of data that relates to one or more application servers. For example, Drive A:\ stores email data, while Drive B:\ stores Health Insurance Portability and Accountability Act (HIPAA) data.

In embodiments, the placement/media management module 410 manages the removable disk drives 102 (FIG. 1) in the archive 412. For example, the placement/media management module 410 determines when cartridges need replacing because the removable disk drive 102 (FIG. 1) is at or near capacity. In embodiments, the placement/media management module 410 also separately addresses the removable disk drives 102 (FIG. 1) and provides the addressing information to the indexing module 408 for storing data in the correct application layer partition. The placement/media management module 410 may also transform commands received by the archiving system 402 into vendor specific commands understandable by the archive 412. In further embodiments, the placement/media management module 410 can overwrite or alter data to make the data on the removable disk drive 102 (FIG. 1) irretrievable. The overwriting or erasing of data is called digital shredding and is explained in conjunction with FIGS. 5-10.

Figure 4B:
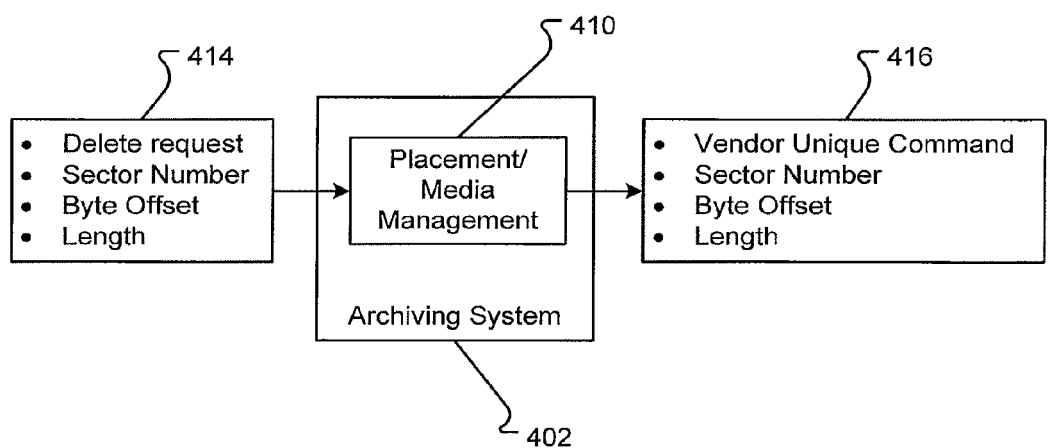

A further embodiment of the archiving system 402 and, more particularly, the placement/media management module 410 is shown in FIG. 4B. In embodiments, the placement/media management module 410 receives a delete request 414. The delete request 414 may include one or more of, but is not limited to, the delete request, a sector number where the data, associated with the delete request, starts, the byte offset of where in the sector the data starts, and/or the length of the data in bytes, bits, or sectors. In embodiments, the placement/media management module 410 transforms the delete request 414 into a vendor unique command 416. The vendor unique command 416 may be one or more commands that digitally shred data in the removable disk drive 102 (FIG. 1). For example, the digital shred may require a series of six writes to the area where the data was stored rather than simply showing the memory area as available for storage, which is the method many deletes use. In embodiments, the vendor unique command 416 may include one or more of, but is not limited to, the vendor specific command(s), a sector number where the data, associated with the delete request, starts, the byte offset of where in the sector the data starts, and/or the length of the data in bytes, bits, or sectors.

Figure 5:
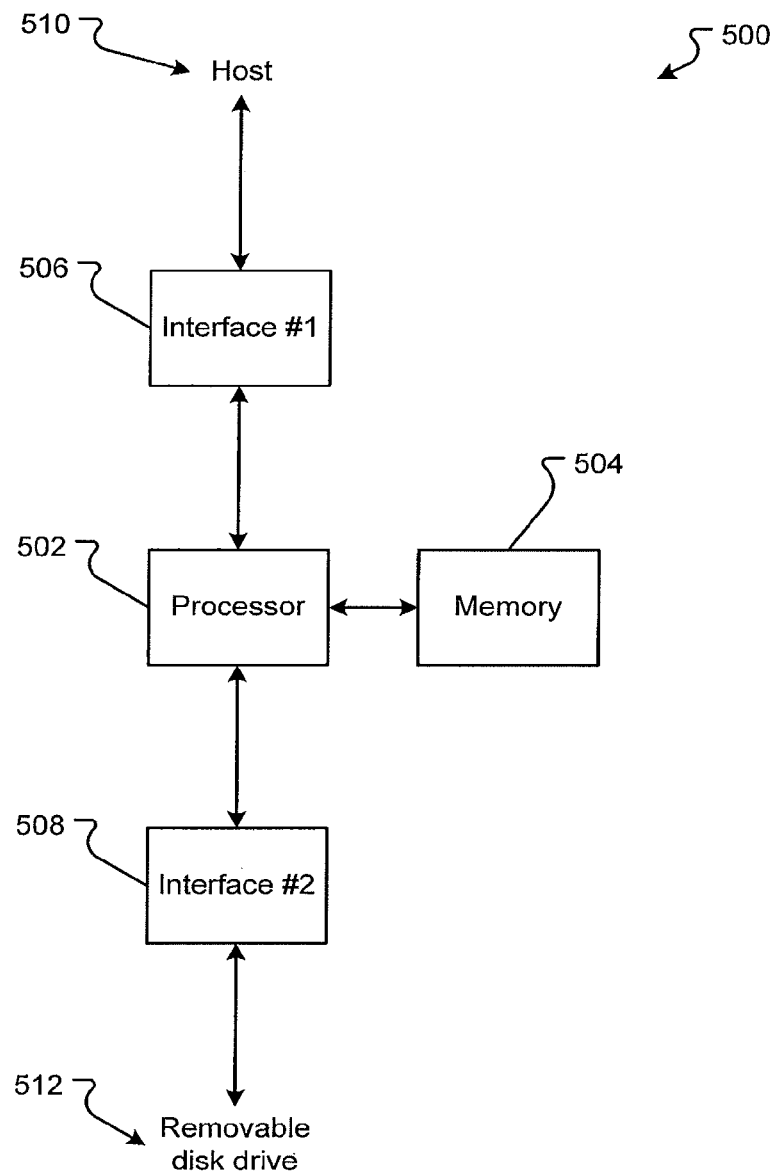
FIG. 5 is a functional block diagram of an embodiment of a modular drive bay.

Embodiments of the hardware/firmware 500 of the modular drive bay is shown in FIG. 5. In embodiments, the hardware/firmware 500 is the same or similar to hardware/firmware 116 explained in conjunction with FIG. 1. The hardware/firmware 500, in embodiments, comprises a first interface (interface #1) 506, a processor 502, a memory 504, and a second interface (interface #2) 508. In embodiments, the first interface 506 receives archival data from the host 510 for storage in a removable disk drive 512 and/or sends archived data from the removable disk drive 512 to the host 510. Removable disk drive 512 is, in embodiments, the same or similar to removable disk drive 102 (FIG. 1) described in conjunction with FIG. 1. The first interface 506 can be any type of interface operable to communicate with the host 510. In embodiments, the host 510 is the archiving system appliance 210 (FIG. 2) and/or archiving system 312 (FIG. 3). The first interface 506 can be a Firewire, USB, SATA, or other interface.

The processor 502 is operable to execute software or firmware stored in memory 504 for storing or retrieving archival data from the removable disk drive 512. The processor 502, in embodiments, is any processor known in the art for executing the functions described herein. For example, the processor 502 is an Intel Pentium, ASIC, FPGA, or other device. The processor 502 interfaces with the first interface 506 to receive archival data for storage and sends data requested from the host 510. The processor 502 further interfaces with the second interface 508 to send data to the removable disk drive 512 and read data from the removable disk drive 512. Further, the processor 502 executes operations, such as a digital shred, on the removable disk drive 512. The memory 504 may be any type of memory including RAM, ROM, disk drive, etc. The memory may store data or metadata and interfaces with the processor 502.

In embodiments, the second interface 508 retrieves archival data from the removable disk drive 512 to send to the host 510 and sends archival data to the removable disk drive 512 for storage. The second interface 508 can be any type of interface operable to communicate with the removable disk drive 512. The second interface 512 can be a Firewire, USB, SATA, or other interface.

Figure 6:
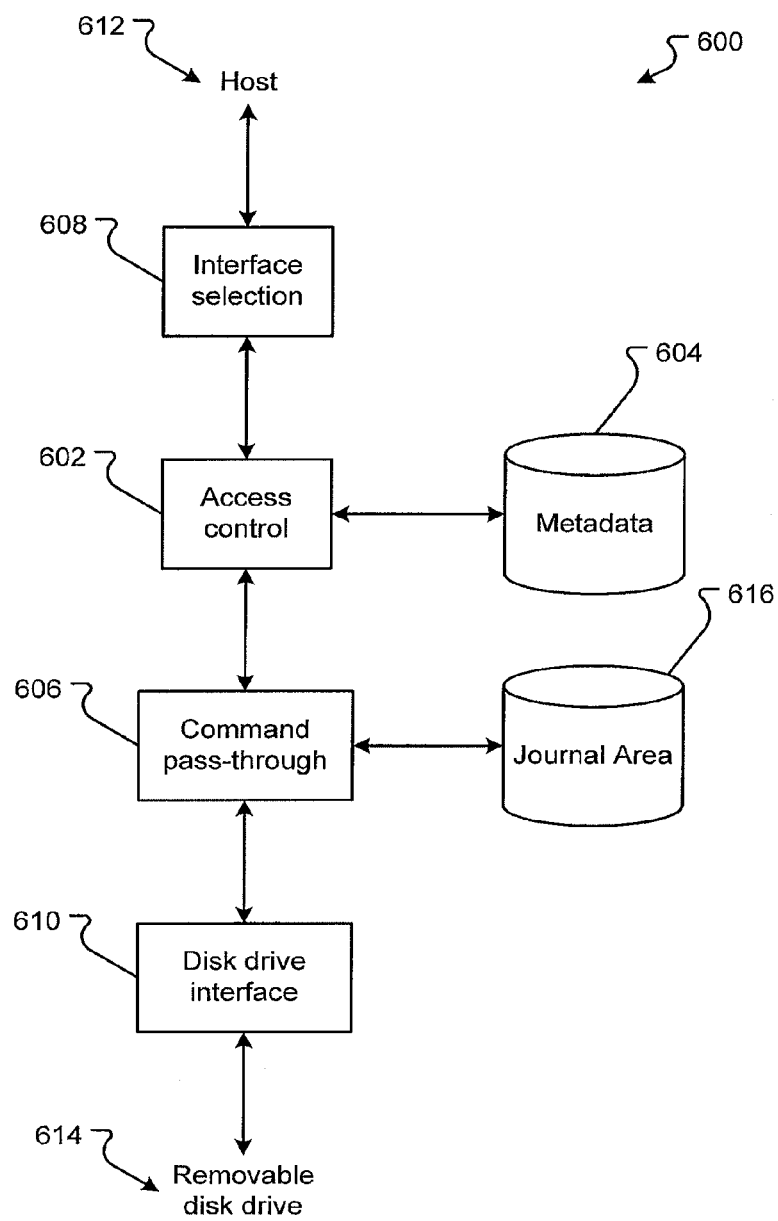
FIG. 6 is a block diagram of an embodiment of information elements stored in a removable disk drive.

A functional block diagram of an embodiment of the hardware/firmware 600 of the modular drive bay 212, 214 (FIG. 2) is shown in FIG. 6. In embodiments, the hardware/firmware 600 is the same or similar to hardware/firmware 116 explained in conjunction with FIG. 1 or hardware/firmware 400 described in conjunction with FIG. 4. In embodiments, the hardware/firmware 600 represents software executed in the hardware/firmware 400 (FIG. 4). The hardware/firmware 600, in embodiments, comprises an interface selection module 608, an access control module 602, a metadata datastore 604, a command pass-through module 606, a journal area 616, and/or a disk drive interface 610.

In embodiments, the interface selection module 608 receives requests from the host 612 to digitally shred archival data. The host 612 may send the requests with a predetermined address for the archival data. The interface selection module 608 can extract the address received from the host 612 from which to digitally shred the data. This address is, in embodiments, provided to the access control module 602.

The access control module 602 is operable to read metadata from the metadata datastore 604. The access control module 602, in embodiments, builds the metadata, datastore 604 by reading the metadata from one or more removable disk drives 614 and storing the metadata in a table or other data structure in the metadata datastore 604. In embodiments, the metadata datastore 604 provides the first sector address for the data that is to be digitally shredded on the removable disk drive 614. The first sector address can be used by the access control module 602 to determine where to begin the digital shred. The access control module 602 can be executed within the processor 402 (FIG. 4).

In embodiments, the command pass-through module 606 sends the write commands to the removable disk drive 614 to digitally shred the data. For example, if the request received by the host 612 is for a delete of data, the command pass-through module 606 executes one or more writes on the removable disk drive 614 to digitally shred the data. The requested command sent from the host 612 may be in one format or compile with one file system. The command pass-through module 606 may change the command to a command understandable by the removable disk drive 614. In further embodiments, the access control module 602 provides the command pass-through module 606 with the first sector address to ensure the command pass-through module 606 digitally shreds the data at the correct address in the removable disk drive 614.

In further embodiments, the command pass-through module 606 may read one or more sectors of data from the removable disk drive 614 and store the data in a temporary journal area 616. In any one sector of the removable disk drive 102 (FIG. 1), two or more different information elements may be stored. The digital shredding can occur on sector boundaries, which necessarily cause one or more information elements that were not supposed to be deleted to be overwritten. The command pass-through module 606 overcomes this problem by writing all data in the sectors to be digitally shredded to the journal area 616. The command pass-through module 606 can then execute the one or more writes on the sectors storing the deleted data. Then, the command pass-through module 606, in embodiments, copies only the other information elements that were not to be deleted back to the same area in the sectors that were overwritten. This process is explained in conjunctions with FIGS. 7C-E.

The disk drive interface 610, in embodiments, is a disk drive driver or other software that allows the command pass-through module 606 interface with the removable disk drive 614. Thus, the disk drive interface 610 may convert commands for the removable disk drive 614.

An embodiment of an archive 702 stored in a removable disk drive 102 (FIG. 1), such as removable disk drive 512 (FIG. 5), having archival data that is to be digitally shredded is shown in FIG. 7A. The same archive 702 after the digital shred is shown in FIG. 7B In embodiments, the archive 702 is a representation of the memory in the removable disk drive 102 (FIG. 1). In the example presented in FIGS. 7A and 7B, there is archival data 702 that may have one or more portions that represent files or "information elements" stored in an archive 702. For example data 710 may represent a first information element while data 704 and/or 716 represents another information element. There may be more files than that shown in the exemplary archive 702.

In embodiments, the archive 702 stores the data on memory sector boundaries 708. A sector, in embodiments, is a portion of the memory within the removable disk drive 102 (FIG. 1) that represents the smallest portion of the memory that can be addressed. In embodiments, each information element stored to the memory of the removable disk drive 102 (FIG. 1) is stored starting at a sector boundary. For example, information element 712 is stored in two sectors and begins at sector boundary 708. However, information element 712 is not large enough to fill both sectors and leaves some portion 714 of a sector as unfilled. The next information element 715 is stored starting at the next sector boundary.

The data in the archive 702 may be digitally shredded at sector boundaries. Every file, in embodiments, starts at a sector boundary and stores data in one or more subsequent sectors but does not share a sector with another file. As such, the sectors containing the information element may be digitally shredded to digitally shred the information element. For example, to digitally shred information element 715, the command pass-through module 606 (FIG. 6) writes data to the sectors represented by bracket 704. The archive 702 after the rewrite or digital shred is shown in FIG. 7B where sectors 704 are now overwritten and available.

Figure 7C:
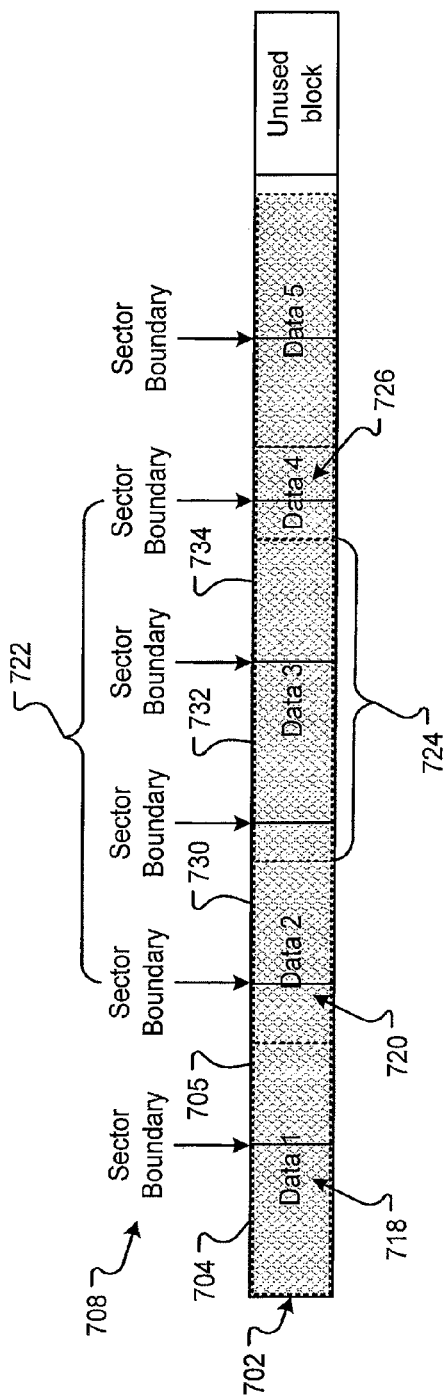
FIG. 7 is another block diagram of an embodiment of information elements stored in a removable disk drive.
Figure 7D:
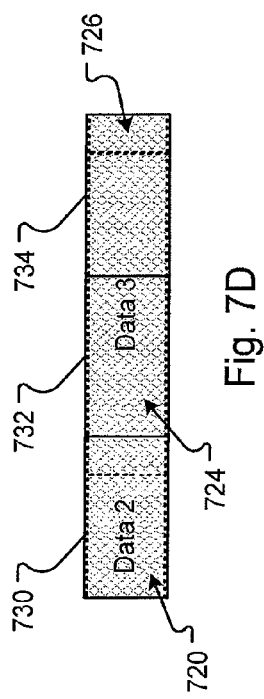
Figure 7E:
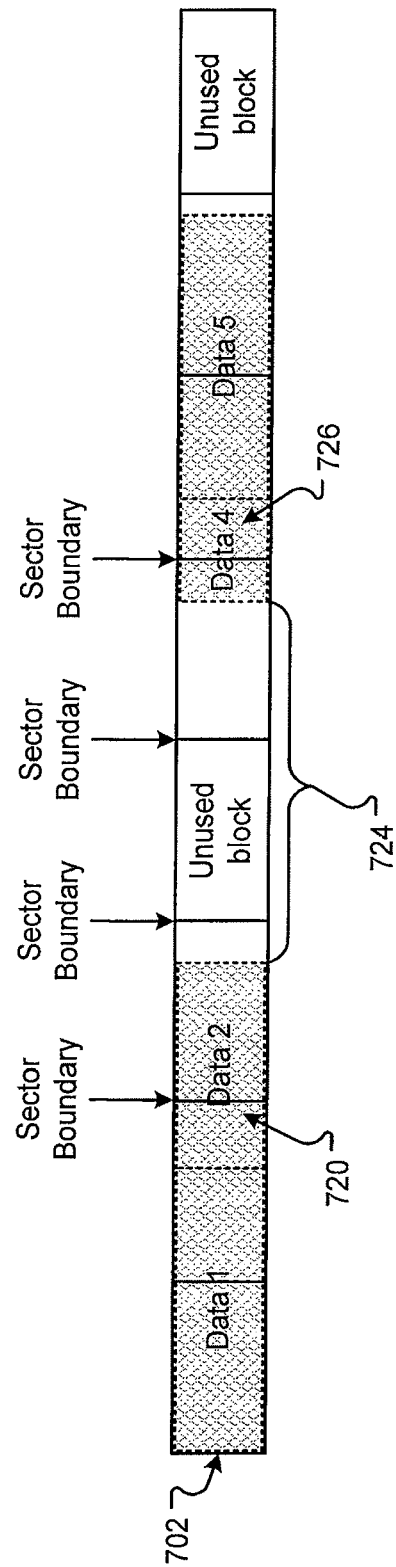

Another embodiment of an archive 702 is shown in FIGS. 7C-E. The memory again includes two or more sectors, for example, sector 704, which has sector boundaries, for example, sector boundary 708. The archived data stored in a removable disk drive 102 (FIG. 1) is shown in FIGS. 7A-C. In the embodiments represented in FIGS. 7C-E, the data or information elements may be stored across sector boundaries and the beginning of an information element may be stored at a location other than the beginning of a sector. For example, information element 718 is stored in sector 704 and partially in sector 705. Information element 720 is then stored starting at the end of information element 718 in the middle of sector 705. As such, the memory in the archive 702 is more efficiently utilized. However, digital shredding cannot occur on sectors as with FIGS. 7A and B because other files that are not to be digitally shredded could be affected.

In embodiments, a digital shred is to be completed on an information element, such as information element 724. The command pass-through module 606 (FIG. 6) may then copy the contents of the sectors 730, 732, and 734 into a journal area 616 (FIG. 6). The contents of the journal area 616 (FIG. 6) is shown in FIG. 7D. In sector 730 a portion of information element 720 is included and a portion of information element 726 is included in sector 734. Digitally shredding the sectors 730, 732, and 734 without protecting those portions of information elements 720 and 726 would result in data loss as portions of information elements 720 and 726 would be deleted.

Once the contents of the sectors 730, 732, and 734 are copied to the journal area 616 (FIG. 6), the command pass-through module 606 (FIG. 6) can overwrite the sectors 730, 732, and 734 to digitally shred the information element 724. Then, the command pass-through module 606 (FIG. 6), in embodiments, deletes the information element 724 from the data copied to the journal area 616 (FIG. 6). The command pass-through module 606 (FIG. 6) can rewrite the data not to be deleted in the journal area 616 (FIG. 6) back into the sectors 730 and 734 in the archive 702. After the rewrite, the archive 702 is as shown in FIG. 7E where the area of memory 724 previously occupied by the information element is now unused and the portions of information elements 720 and 726 are maintained in the archive 702.

Figure 8:
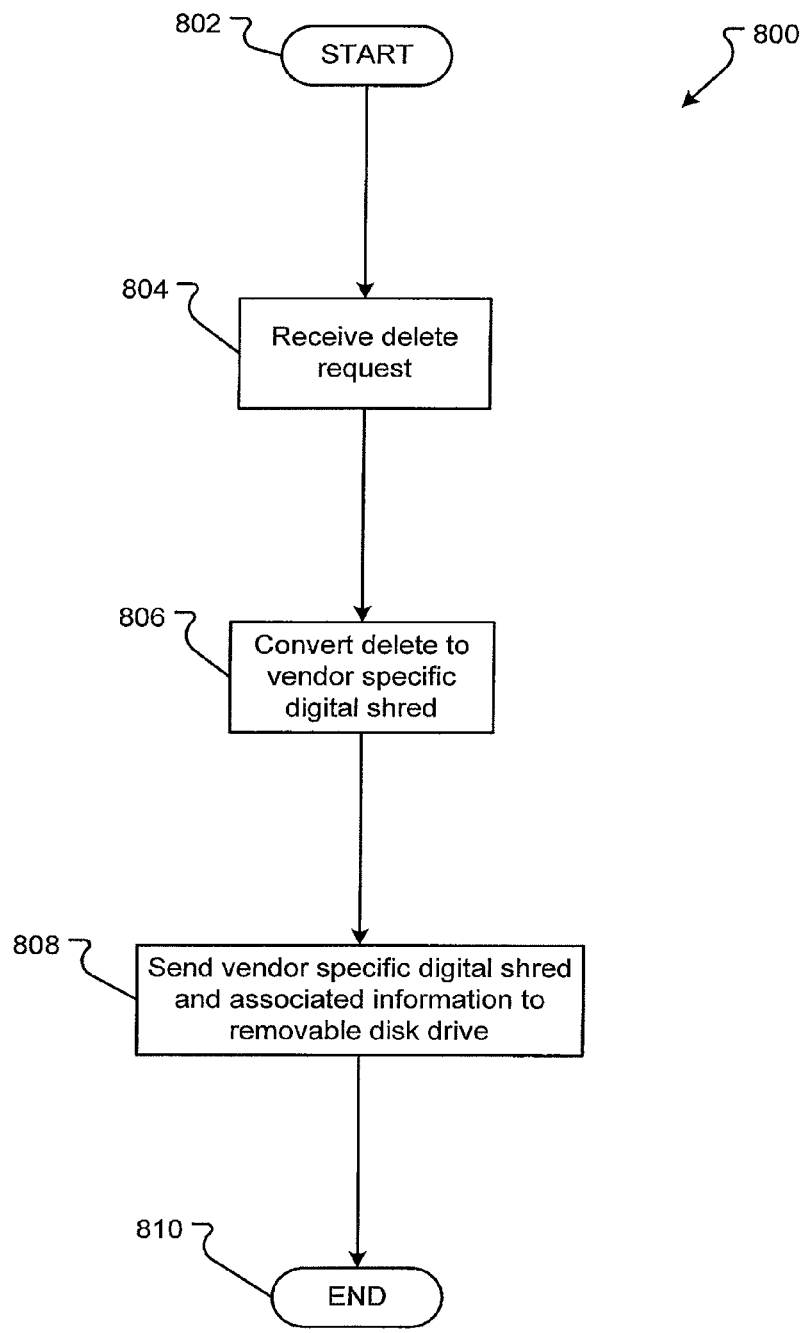
FIG. 8 is a flow diagram of an embodiment of a method for storing data on a removable disk drive.

An embodiment of a method 800 for digitally shredding data in an archive is shown in FIG. 8. In embodiments, the method 800 generally begins with a START operation 802 and terminates with an END operation 810. The steps shown in the method 800 may be executed in a computer system as a set of computer executable instructions. While a logical order is shown in FIG. 8, the steps shown or described can be, in some circumstances, executed in a different order than presented herein.

Receive operation 804 receives a delete request. In embodiments, the archiving system 312 (FIG. 3) receives a delete request in concordance with the file system used in the network storage system 302 (FIG. 3). The delete request and the data associated with the delete request 414 (FIG. 4B), in embodiments, is received by the placement/media management module 410 (FIG. 4A).

Convert operation 806 converts the delete request into a vendor specific digital shred. In embodiments, the archiving system 312 (FIG. 3) interprets the delete request and matches the delete request with one or more commands understandable by the removable disk drive 102 (FIG. 1). Further, the archiving system 312 (FIG. 3) can modify a delete request, which may make the area of memory in the removable disk drive 102 (FIG. 1) available but is not overwritten until new data is stored in the memory location. As such, data that should be protected could be retrieved. Thus, the archiving system 312 (FIG. 3), in embodiments, converts the delete into a digital shred, which can overwrite the data to ensure the data cannot be retrieved.

Send operation 808 sends the one or more converted digital shred commands. In embodiments, the placement/media management module 410 (FIG. 4A) sends one or more commands 416 (FIG. 4B) representing the digital shred to the removable disk drive 102 (FIG. 1). The removable disk drive 102 (FIG. 1) may then execute a digital shred to complete the delete.

Figure 9:
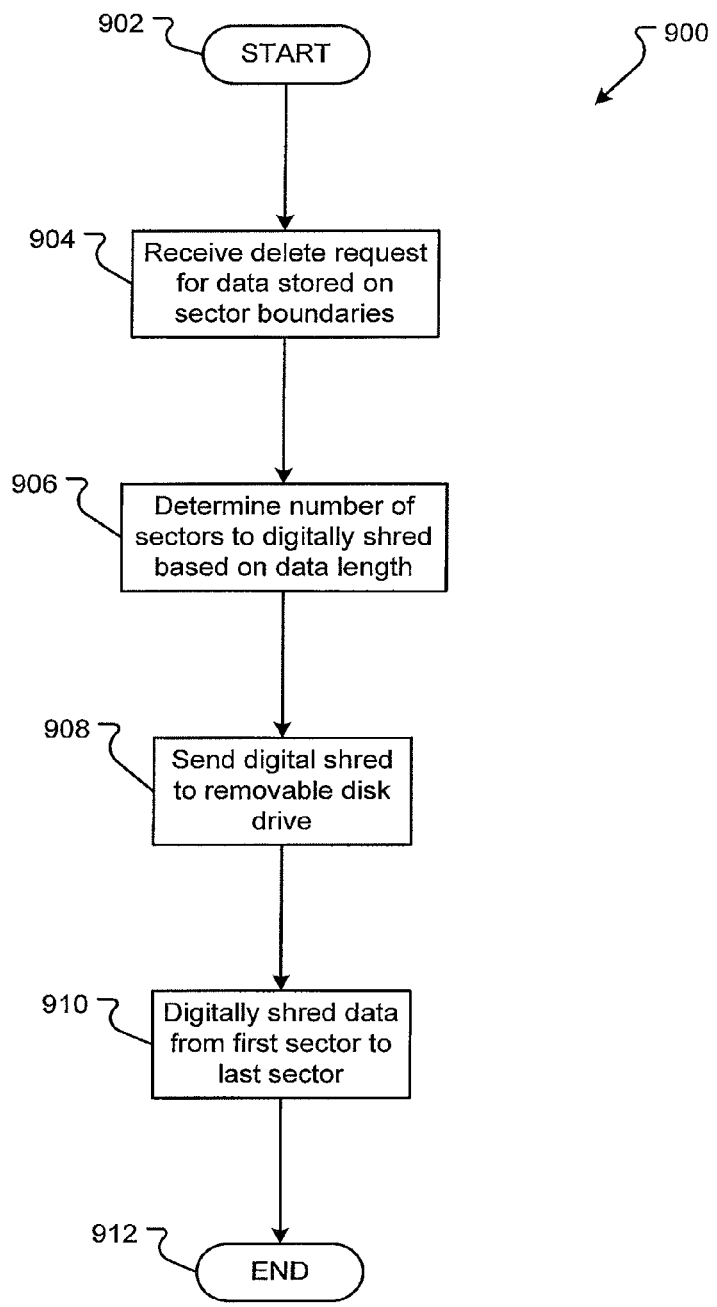
FIG. 9 is another flow diagram of an embodiment of a method for storing data on a removable disk drive.

Another embodiment of a method 900 for digitally shredding data in a removable disk drive 102 (FIG. 1) is shown in FIG. 9. In embodiments, the method 900 generally begins with a START operation 902 and terminates with an END operation 912. The steps shown in the method 900 may be executed in a computer system as a set of computer executable instructions. While a logical order is shown in FIG. 9, the steps shown or described can, in some circumstances, be executed in a different order than presented herein. The method 900, in embodiments, relates to archive 702 described in conjunction with FIGS. 7A-B. The archive 702 stores data on memory sector boundaries.

Receive operation 904 receives a delete request for data stored on sector boundaries. In embodiments, the archiving system 312 (FIG. 3) receives a delete request in concordance with the file system used in the network storage system 302 (FIG. 3). The delete request and the data associated with the delete request 414 (FIG. 4B), in embodiments, is received by the placement/media management module 410 (FIG. 4A).

Determine operation 906 determines the number of sectors to digitally shred. In embodiments, the placement/media management module 410 (FIG. 4A) reads the data length provided in the delete request 414 (FIG. 4B). In embodiments, a memory sector in the removable disk drive 102 (FIG. 1) is 512 bytes. As such, the placement/media management module 410 (FIG. 4A) divides the data length by 512 bytes to determine the number of sectors to digitally shred. For example, if the information elements is 10,000 bytes, the placement/media management module 410 (FIG. 4A) would digitally shred 20 sectors.

Send operation 908 sends one or more digital shred commands to the removable disk drive 102 (FIG. 1) with an indication of the number of sectors to be overwritten. In embodiments, the placement/media management module 410 (FIG. 4A) sends one or more commands 416 (FIG. 4B) representing the digital shred to the removable disk drive 102 (FIG. 1). For example, the placement/media management module 410 (FIG. 4A) sends one or more writes of random bits to overwrite the data in the sectors associated with the digital shred.

Shred operation 910 digitally shreds the data. In embodiments, the removable disk drive 102 (FIG. 1) may then execute a digital shred to complete the delete. The digital shred may begin at the sector boundary where the information element begins and continue through the number of sectors determined by the placement/media management module 410 (FIG. 4A).

Figure 10:
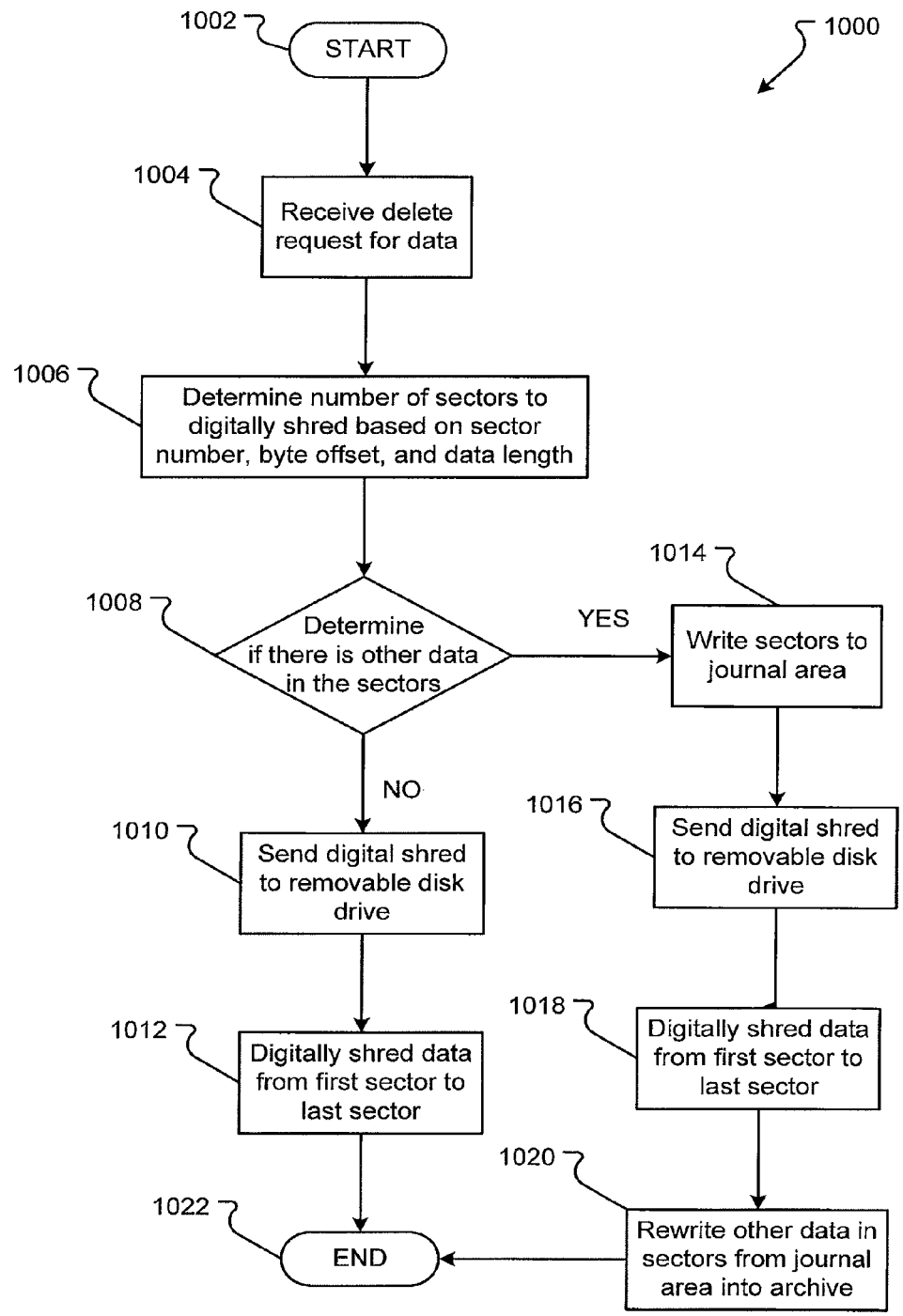
FIG. 10 is yet another flow diagram of an embodiment of a method for storing data on a removable disk drive.

Another embodiment of a method 1000 for deleting data in an archive and protecting the data as immutable is shown in FIG. 10. In embodiments, the method 1000 generally begins with a START operation 1002 and terminates with an END operation 1022. The steps shown in the method 1000 may be executed in a computer system as a set of computer executable instructions. While a logical order is shown in FIG. 10, the steps shown or described can, in some circumstances, be executed in a different order than presented herein. The method 1000, in embodiments, relates to archive 702 described in conjunction with FIGS. 7C-E.

Receive operation 1004 receives a delete request for data stored within a sector but not necessarily on sector boundaries. In embodiments, the archiving system 312 (FIG. 3) receives a delete request in concordance with the file system used in the network storage system 302 (FIG. 3). The delete request and the data associated with the delete request 414 (FIG. 4B), in embodiments, is received by the placement/media management module 410 (FIG. 4).

Determine operation 1006 determines the number of sectors to digitally shred. In embodiments, the placement/media management module 410 (FIG. 4A) reads the sector number, byte offset, and data length provided in the delete request 414 (FIG. 4B). In embodiments, a memory sector in the removable disk drive 102 (FIG. 1) is 512 bytes. As such, the placement/media management module 410 (FIG. 4A) finds the start of the information element within the sector. For example, the placement/media management module 410 (FIG. 4A) determines that information element 724 (FIGS. 7C-E) begins at a location within sector 730 (FIGS. 7C-D). The placement/media management module 410 (FIG. 4A) can then determine, by the data length, at what address the information element ends. For example, the placement/media management module 410 (FIG. 4A) determines that the information element 724 (FIGS. 7C-E) ends in sector 734 (FIGS. 7C-D). Then, the placement/media management module 410 (FIG. 4A) can determine what sectors are between the first sector and last sector. For example, sector 732 is between sector 730 and sector 734, as shown in FIGS. 7C-D. As such, the placement/media management module 410 (FIG. 4A) determines the sectors that need to be digitally shredded.

Determine operation 1008 determines if there is other data in the one or more sectors containing the data to be digitally shredded. In embodiments, the placement/media management module 410 (FIG. 4A) determines if the one or more other information elements have an address within the sectors determined to be digitally shredded. For example, the placement/media management module 410 (FIG. 4A) could search for information elements with a sector address of sector 734 (FIGS. 7C-D). The placement/media management module 410 (FIG. 4A) would find that information element 726 (FIGS. 7C-C) has a sector address of sector 734 (FIGS. 7C-E). The placement/media management module 410 (FIG. 4A) may simply scan for data in other parts of the sector not including the information element to be digitally shredded. In other embodiments, the placement/media management module 410 (FIG. 4A) accesses the database 404 (FIG. 4A) to determine the address and data lengths for data near the sectors to be digitally shredded. For example, the placement/media management module 410 (FIG. 4A) may scan for an address in sector 705 (FIG. 7C) and could find that information element 2 has a sector address in sector 705 (FIG. 7C). The placement/media management module 410 (FIG. 4A) could then determine from the data length associated with information element 720 (FIGS. 7C-E) that information element 720 (FIGS. 7C-E) contains data stored in sector 730 (FIGS. 7C-D). If one or more other information elements are stored in the sectors to be digitally shredded, the method flows YES to write operation 1014. If one or more other information elements are not stored in the sectors to be digitally shredded, the method flows NO to send operation 1010.

Write operation 1014 writes the sectors identified in determine operation 1006 to a journal area, for example, journal area 616 (FIG. 6). In embodiments, placement/media management module 410 (FIG. 4A) or the command pass-through module 606 (FIG. 6) writes the data in the sectors to the journal area 616 (FIG. 6). For example, the data copied to the journal area 616 (FIG. 6) is shown in FIG. 7D and contains data from information element 720, information element 724 and information element 726.

Send operation 1016 sends one or more digital shred commands to the removable disk drive 102 (FIG. 1) with an indication of the sectors to be overwritten. In embodiments, the placement/media management module 410 (FIG. 4A) sends one or more commands 416 (FIG. 4B) representing the digital shred to the removable disk drive 102 (FIG. 1). For example, the placement/media management module 410 (FIG. 4A) sends one or more writes of random bits to overwrite the data in the sectors associated with the digital shred.

Shred operation 1018 digitally shreds the data. In embodiments, the removable disk drive 102 (FIG. 1) may then execute a digital shred to complete the delete. The digital shred may begin at the sector boundary of the first sector and continue through the number of sectors determined by the placement/media management module 410 (FIG. 4A).

Rewrite operation 1020 rewrites the data that was not to be digitally shredded from the journal area to back to the sectors digitally shredded. In embodiments, the placement/media management module 410 (FIG. 4A) or the command pass-through module 606 (FIG. 6) erases the information element 724 (FIGS. 7C-E) from the data in the journal area 616 (FIG. 6). Then, the placement/media management module 410 (FIG. 4A) or the command pass-through module 606 (FIG. 6) rewrites the sectors from the journal area 616 (FIG. 6) to the archive 702 as shown in FIG. 7E. The rewrite replaces the data for information element 720 and information element 726, as shown in FIGS. 7C-E. In another embodiment, the placement/media management module 410 (FIG. 4A) or the command pass-through module 606 (FIG. 6) copies only the data from information element 720 and information element 726 back to the archive 702, as shown in FIG. 7E.

Send operation 1010 sends one or more digital shred commands to the removable disk drive 102 (FIG. 1) with an indication of the sectors to be overwritten. In embodiments, the placement/media management module 410 (FIG. 4A) sends one or more commands 416 (FIG. 4B) representing the digital shred to the removable disk drive 102 (FIG. 1). For example, the placement/media management module 410 (FIG. 4A) sends one or more writes of random bits to overwrite the data in the sectors associated with the digital shred.

Shred operation 1012 digitally shreds the data. In embodiments, the removable disk drive 102 (FIG. 1) may then execute a digital shred to complete the delete. The digital shred may begin at the sector boundary where the information element begins and continue through the number of sectors determined by the placement/media management module 410 (FIG. 4A).

In light of the above description, a number of advantages of the present disclosure are readily apparent. For example, the host or application servers need not understand the commands sent to the archives Rather, the application server can use a simple delete command in the protocol of the file system, but the archive will respond by digitally shredding the data. Further, the digital shredding systems and methods overcome disadvantages of random access memory that requires storage on or in sectors. The data can still be deleted in the sectors but data that is not to be digitally shredded may be returned.

A number of variations and modifications can also be used. For example, the digital shred is executed within the sector and not on whole sectors. If a different type of memory is used that allows more granular division of the memory, the system could digitally shred the data in response to a delete command without writing information to a journal area.

While the principles of the disclosure have been described above in connection with specific apparatuses and methods, it is to be clearly understood that this description is made only by way of example and not as limitation on the scope of the disclosure.

The invention claimed is:

1. A data storage system comprising:
   one or more removable drives configured to store data, each of the removable drives comprising:
   a data cartridge case;
   a connector coupled to the data cartridge case; and
   memory enclosed by the data cartridge case and in communication with the connector, the memory configured to store the data;
   a drive bay comprising:
   a plurality of drive ports, each drive port including a data cartridge connector configured to mate with the connector of one of the removable drives in order to communicate with the memory; and
   a processor for receiving a delete request associated with selected data stored in the memory, wherein the processor is configured to convert the delete request into a digital shred command for the selected data and to send the digital shred command to one or more of the removable drives; and a temporary journal area configured for copying the data during the digital shredding, wherein the processor is configured to rewrite data other than the selected data from the journal area back to the memory after digital shredding, such that the selected data are digitally shredded and the other data are not digitally shredded.

2. The system of claim 1, further comprising:

a first interface configured to receive the delete request for the processor;

a datastore configured to provide an address for the data stored on the memory to the processor; and a second interface configured to send the digital shred command from the processor to the one or more removable drives with the address for the data to be digitally shredded.

3. The system of claim 2, wherein the processor is configured to convert the delete request into a vendor-specific digital shred request command understandable by the removable drive.

4. The system of claim 3, wherein the processor is further configured to send the digital shred command as multiple writes of random bits to overwrite the selected data multiple times.

5. The system of claim 1, wherein the processor is further configured to determine a number of sectors to digitally shred in the memory, based on the delete request.

6. The system of claim 5, wherein the processor is further configured to determine whether the other data not to be digitally shredded are stored in the sectors to be digitally shredded.

7. The system of claim 6, wherein the processor is further configured to copy the sectors to be digitally shredded to the temporary journal area.

8. The system of claim 7, wherein the processor is further configured to rewrite only the other data from the journal area back to the sectors, such that only the selected data are digitally shredded.

9. An archiving system comprising the data storage system of claim 1 coupled to a host computer.

10. A data archive comprising:

a plurality of removable drives comprising an addressable non-transitory computer readable storage medium having memory addresses configured for storage and retrieval of archival data, wherein selected archival data are to be digitally shredded in response to a delete request associated with the archival data;

a processor configured to convert the delete request to a digital shred command understandable by the removable drive;

a database configured to provide the memory addresses associated with the selected archival data; and a temporary journal area for copying the archival data during the digital shredding, wherein the processor is configured to rewrite archival data other than the selected archival data from the temporary journal area back to the memory addresses, such that the selected archival data are digitally shredded in response to the delete request and the other archival data are not digitally shredded in response to the delete request.

11. The data archive of claim 10, wherein the removable drive comprises a removable data cartridge.

12. The data archive of claim 11, wherein the addressable non-transitory computer readable storage medium comprises a non-transitory computer readable magnetic medium.

13. The data archive of claim 10, wherein the removable drive comprises a removable disk drive and the addressable non-transitory computer readable storage medium comprises a non-transitory computer readable magnetic disk.

14. The data archive of claim 10, wherein the selected archival data comprise a selected file stored on the addressable non-transitory computer readable storage medium, the selected file starting at a sector boundary and leaving at least a portion of a sector unfilled.

15. The data archive of claim 14, wherein the processor is further configured for overwriting the selected file starting at the sector boundary and including the unfilled portion of the sector.

16. The data archive of claim 10, wherein the selected archival data comprise a selected file stored on the addressable non-transitory computer readable storage medium, the selected file starting between sector boundaries in the middle of a sector comprising other data not to be overwritten.

17. The data archive of claim 16, wherein the processor is further configured for copying the sector to the temporary journal area and for rewriting the other data after overwriting the sector.

18. A non-transitory computer readable storage medium having program code stored thereon, the program code executable by a processor to perform a method comprising:

receiving a delete request for selected archival data stored on a removable drive;

accessing a database to determine memory addresses to digitally shred, based on the delete request and a data length associated with the selected archival data;

converting the delete request to a digital shred command understandable by the removable drive;

copying the archival data determined by the memory addresses to a temporary journal area;

sending the digital shred command to the removable drive, such that random data are written to the removable drive at the memory addresses; and rewriting archival data other than the selected archival data from the temporary journal area to the memory addresses; such that the selected archival data are digitally shredded and the other archival data are not digitally shredded.

19. The non-transitory computer readable storage medium of claim 18, wherein the method comprises sending the digital shred command as vendor-specific command to write random data at the memory addresses multiple times.

* * * * *